United States Patent
Shatil et al.

(10) Patent No.: US 12,495,322 B2
(45) Date of Patent: Dec. 9, 2025

(54) APPLICATION-INDEPENDENT DETECTION OF WIRELESS ENVIRONMENT IMPACTS

(71) Applicant: ZEBRA TECHNOLOGIES CORPORATION, Lincolnshire, IL (US)

(72) Inventors: Ohad Shatil, Dunwoody, GA (US); Jonathan Chen, Medford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 328 days.

(21) Appl. No.: 18/222,329

(22) Filed: Jul. 14, 2023

(65) Prior Publication Data
US 2025/0024279 A1    Jan. 16, 2025

(51) Int. Cl.
*H04W 16/22* (2009.01)
*H04W 24/02* (2009.01)
(Continued)

(52) U.S. Cl.
CPC ........... *H04W 24/08* (2013.01); *H04W 16/22* (2013.01); *H04W 24/02* (2013.01); *H04W 24/10* (2013.01);
(Continued)

(58) Field of Classification Search
CPC ....... G06N 3/02–105; G06N 20/00–20; H04B 17/0082–3913; H04L 41/14–26; H04L 43/02–55; H04W 8/22–245; H04W 16/18–225; H04W 24/02–10; H04W 28/02–26; H04W 80/02–12; H04W 84/005–22; H04W 88/005–188; H04W 92/02–24
See application file for complete search history.

(56) References Cited

U.S. PATENT DOCUMENTS

2018/0285694 A1    10/2018  Kobayashi
2020/0169509 A1*   5/2020   Tigli ................. H04L 41/147
(Continued)

OTHER PUBLICATIONS

PCT/US24/37952—International Search Report, USPTO ISA/US, Sep. 13, 2024.
(Continued)

*Primary Examiner* — Timothy J Weidner (57) ABSTRACT

A method in a computing device includes: monitoring, via a communications interface of the computing device, wireless data elements including application data corresponding to a communications application, and non-application data; automatically generating labels based on the application data of the wireless data elements, the labels indicating performance impacts observable in the communications application; selecting a portion of the wireless data elements corresponding to the non-application data; extracting, from each wireless data element of the non-application data, a set of feature values; generating a plurality of samples from the non-application data, each sample including (i) a number of the sets of feature values based on a sample size, and (ii) one of the automatically generated labels; training a classifier based on the plurality of samples, the classifier configured to receive further non-application data and generate a predicted impact indicator selected from the labels; and deploying the classifier.

21 Claims, 9 Drawing Sheets

(51) Int. Cl.
  *H04W 24/08* (2009.01)
  *H04W 24/10* (2009.01)
  *H04W 80/12* (2009.01)
  *H04W 84/02* (2009.01)
  *H04W 88/02* (2009.01)
  *H04W 92/10* (2009.01)
(52) U.S. Cl.
  CPC ............ *H04W 80/12* (2013.01); *H04W 84/02* (2013.01); *H04W 88/02* (2013.01); *H04W 92/10* (2013.01)

(56) References Cited

U.S. PATENT DOCUMENTS

| | | |
|---|---|---|
| 2022/0014398 A1 | 1/2022 | Andrews et al. |
| 2022/0255816 A1 | 8/2022 | Eriksson et al. |
| 2022/0286885 A1 | 9/2022 | Wang et al. |
| 2023/0014795 A1 | 1/2023 | Khan et al. |
| 2023/0300039 A1* | 9/2023 | Kersch ................ H04L 41/16 |
| 2024/0064106 A1* | 2/2024 | Schiocchet ........... H04L 41/147 |
| 2024/0154912 A1* | 5/2024 | Naik ................ H04L 41/16 |

OTHER PUBLICATIONS

PCT/US24/37952—Written Opinion of the International Searching Authority (ISA), USPTO ISA/US, Sep. 13, 2024.

\* cited by examiner

APPLICATION-INDEPENDENT DETECTION OF WIRELESS ENVIRONMENT IMPACTS

BACKGROUND

A variety of factors can impact the performance of a wireless communications application (e.g., a voice call application), as perceived by an operator of the application. Some of those factors may be readily detectable, such as a loss of wireless connectivity, which can lead to audible breaks in a voice call. Other factors, however, may be difficult to detect despite causing perceptible performance issues (e.g., periods of stuttering audio, or the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: monitoring, via a communications interface of the computing device, wireless data elements including application data corresponding to a communications application, and non-application data; automatically generating labels based on the application data of the wireless data elements, the labels indicating performance impacts observable in the communications application; selecting a portion of the wireless data elements corresponding to the non-application data; extracting, from each wireless data element of the non-application data, a set of feature values; generating a plurality of samples from the non-application data, each sample including (i) a number of the sets of feature values based on a sample size, and (ii) one of the automatically generated labels; training a classifier based on the plurality of samples, the classifier configured to receive further non-application data and generate a predicted impact indicator selected from the labels; and deploying the classifier.

Additional examples disclosed herein are directed to a computing device, including: a communications interface; and a processor configured to: monitor, via the communications interface, wireless data elements including application data corresponding to a communications application, and non-application data; automatically generate labels based on the application data of the wireless data elements, the labels indicating performance impacts observable in the communications application; select a portion of the wireless data elements corresponding to the non-application data; extract, from each wireless data element of the non-application data, a set of feature values; generate a plurality of samples from the non-application data, each sample including (i) a number of the sets of feature values based on a sample size, and (ii) one of the automatically generated labels; train a classifier based on the plurality of samples, the classifier configured to receive further non-application data and generate a predicted impact indicator selected from the labels; and deploy the classifier.

Further examples disclosed herein are directed to a method in a computing device, the method including: maintaining, at the computing device, a wireless communications application executable to process application data received via a communications interface of the computing device; monitoring, via the communications interface, wireless data elements; selecting a portion of the wireless data elements, the portion excluding wireless data elements containing application data; extracting, from each wireless data element of the selected portion, a set of feature values; providing the sets of feature values to a classifier; receiving, from the classifier, one or more of a predetermined set of performance impact indicators, the obtained performance impact indicator defining a predicted impact of the sets of feature values on processing of the application data via the wireless communications application; and selecting an action based on the performance impact indicator, to mitigate the predicted impact on processing of the application data via the wireless communications application.

Figure 1:
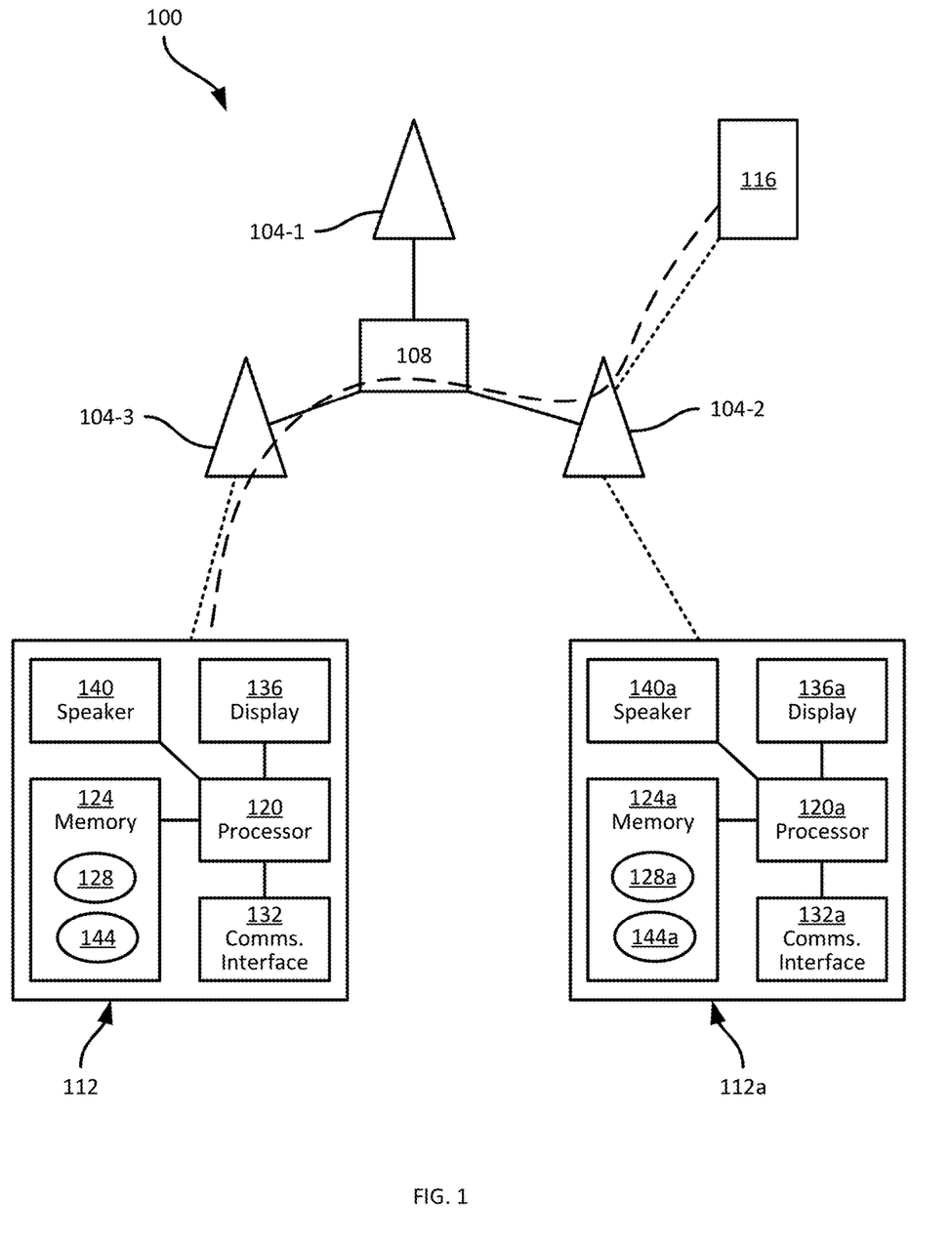
FIG. 1 is a diagram of a wireless communications system.

FIG. 1 illustrates a wireless communications system 100, including one or more wireless networks, such as wireless local area networks (WLANs) based on the Institute of Electrical and Electronics Engineers (IEEE) 802.11 family of standards (e.g., one or more Wi-Fi™ networks). In other embodiments, the system 100 can include one or more wide-area networks, such as cellular networks or the like, in addition to or instead of WLANs. The system 100 can also include wired networks, e.g., interconnecting one or more of the wireless networks.

In the illustrated example, the system 100 includes a WLAN implemented by at least one access point (AP), such as access points 104-1, 104-2, and 104-3 which are referred to collectively herein as the access points 104, and generically as an access point 104 (similar nomenclature may also be used for other numbered components with dashed suffixes). The system 100 can include more than three access points 104 in other examples, or fewer than three access points 104. In further examples, the system 100 can include further base stations in addition to or instead of the APs 104, such as one or more APs implementing other WLANs, cellular base stations implementing a wide-area network, or the like.

Each AP 104 can include an enclosure housing one or more controllers, transceivers, antenna assemblies, and the like. The APs 104 can, as in the illustrated example, be connected with a network controller 108, which can also be implemented by one of the APs 104 in other examples. Client devices within the network can establish wireless communications with other devices within the network and/or with other devices outside the network (e.g., via a gateway implemented by the controller 108 or other suitable network infrastructure). As will be apparent, devices in the network can roam between the APs 104 implementing the network, e.g., according to signal strength, congestion, band preferences, and the like.

In the present example, the system 100 includes a wireless computing device 112 connected to the AP 104-3. The device 112 can be, for example, a mobile computer, a smartphone, a mobile printer, a barcode scanner, a tablet computer, or the like. Certain internal components of the device 112 are shown, including a processor 120, such as a central processing unit (CPU), graphics processing unit (GPU), application-specific integrated circuit (ASIC), or the like, communicatively coupled with a non-transitory computer-readable storage medium such as a memory 124, e.g., a combination of volatile memory elements (e.g., random access memory (RAM)) and non-volatile memory elements (e.g., flash memory or the like). The memory 124 stores a plurality of computer-readable instructions in the form of applications, including in the illustrated example a wireless communications application 128, whose execution by the processor 120 configures the device 112 to establish wireless communications with other devices, such as a communications session (illustrated by a dashed line extending between the device 112 and the device 116) with a further device 116 also connected to the network. The wireless communications established via execution of the application 128 can include any one or more of a voice call, a video call, a file transfer operation, or the like.

The device 112 also includes a communications interface 132, enabling the device 112 to establish connections with WLANs, such as the network implemented by the APs 104. The communications interface 132 can therefore include any suitable combination of transceivers, antenna elements, and corresponding control hardware enabling communications with the APs 104. The processor 120, memory 124, and communications interface 132 can be implemented as components of a system-on-chip (SoC) assembly, in some examples. The device 112 can also include input devices such as a touch screen, a microphone, a camera, or the like, and output devices such as a display 136, a speaker 140, and the like.

The performance of a communication session established by the device 112 can be influenced at least by the wireless connection between the device 112 and the network (e.g., the AP 104-3 in the illustrated example). The performance of wireless communications at the device 112 can refer to a wide variety of performance metrics that are both observable by an operator of the device 112, and measurable from the application 128. For example, the performance of a voice call can correspond to observed audio quality generated via the speaker 140. Under certain conditions, e.g., network congestion, physical obstructions in the environment in which the device 112 is deployed, and the like, audio quality can be negatively affected, leading to perceptible gaps, stuttering, and the like, in audio data received from the device 116 and reproduced at the speaker 140. Various other indications of wireless communications performance are also contemplated, such as visual artifacts in streaming video (including video calls, for example), transfer speeds in file transfer operations, and the like.

Some network events or wireless connection properties can be readily detected and have a high likelihood of producing certain performance impacts on wireless communications. For example, a dropped connection between the AP 104-3 and the device 112 is highly likely to lead to an interruption in an ongoing voice call. The device 112 can be configured to take various mitigating actions in response to detecting a lost connection, such as attempting to reconnect with the AP 104-3, attempting to roam to another AP 104, or the like.

Other network events or wireless connection properties can also have performance impacts on wireless communications, but may be difficult to detect. For example, a voice call may have periods of stuttering audio, gaps in audio output, or the like, despite the connection between the device 112 and the AP 104-3 remaining active. In other words, some performance impacts on wireless communications may originate with the wireless connection between the device 112 and the AP 104-3, but the cause of the performance impact may be multivariate and therefore difficult to automatically detect and mitigate. An operator of the device 112 may therefore perceive the performance impact, e.g., in the form of reduced audio and/or video quality, reduced file transfer throughput, or the like, but the cause of the performance impact may be difficult to discern and therefore difficult to mitigate.

Detecting performance impacts such as those mentioned above may be achieved by modifying the application 128 to monitor performance metrics (e.g., various measures of audio quality). However, integrating performance impact detection into the application 128 facilitates such detection only when the application 128 is running. Further, a wide variety of wireless communications applications are available and multiple such applications may be present on the device 112. Consistent performance impact detection may therefore involve modifying many such applications to include detection functionality. Performance impact detection may then still remain unavailable in the event that no wireless communications application is actively running.

The device 112, in this example, also maintains a monitoring application 144 in the memory 124. In other examples, the monitoring application 144 can reside in the communications interface 132, e.g., as a component of firmware of the communications interface 132, executed by a dedicated controller distinct from the processor 120. In the discussion below, it will be understood that functions described as being performed by the device 100 or by the processor 120 can be performed by either or both of the processor 120, and a controller of the communications interface 132.

Execution of the application 144 configures the device 112 to detect likely performance impacts on wireless communications, without requiring access to the application 128 or any other wireless communications application. More generally, the application 144 facilitates detection of likely performance impacts on wireless communications by monitoring attributes of the connection between the device 112 and the AP 104-3 at or below the transport layer of the Internet protocol (IP) suite. That is, the application 144 implements functionality to detect likely impacts of the current wireless environment of the device 112 on application-level functions (e.g., at or above the application layer of the IP suite), independently of those application-level functions (e.g., without inspecting application-level data).

As discussed in greater detail below, the application 144 implements a classifier, such as a trained neural network model, to process selected feature values extracted from wireless data sent, received and/or generated internally at the communications interface 132. The classifier can be implemented as a deep neural network, e.g., a feed-forward neural network including two or more hidden layers in addition to an input layer and an output layer. The classifier can be implemented and/or deployed using various suitable machine learning libraries, including TensorFlow, ML Kit, and the like, In response to processing the feature values, the classifier generates one or more performance impact indicators, corresponding to predicted impacts of the current wireless environment of the device 112 (as represented by the feature values) on wireless communications performance. For example, a performance impact indicator can indicate that the current wireless environment of the device 112 is likely to result in acceptable voice call quality. A further example performance impact indicator can indicate that the current wireless environment of the device 112 is likely to result in heavily pixelated streaming video. Various other examples of performance impact indicators will also be evident in the discussion below.

The classifier mentioned above can be generated based on a suitable volume of training data including both sets of feature values representing a current wireless environment, and labels indicating the actual performance impacts of the current environment on wireless communications. Prior to generating and deploying the classifier to the device 112, training data can be collected, for example by a computing device 112a connected to the network, as illustrated in FIG. 1. The device 112a can include a processor 120a, memory 124a, communications interface 132a, display 136a, and speaker 140a, as described previously in connection with the components of the device 112. The device 112a can also include a modified wireless communications application 128a, e.g., a voice call application. The application 128a, in contrast to the application 128, can implement functionality facilitating the automated labelling of application data, e.g., to indicate actual performance impacts of the current wireless environment on application performance. The device 112a can also include a modified monitoring application 144a. Rather than collecting and classifying feature values representing the current wireless environment of the device 112a, the application 144a collects and stores sets of feature values, for labelling with data derived by the application 128a and for later provision to a training mechanism used to generate the classifier. A plurality of devices 112a can be deployed to collect training data for use in classifier generation, prior to deploying the resulting classifier to the device 112 (and any other suitable computing device).

Figure 2:
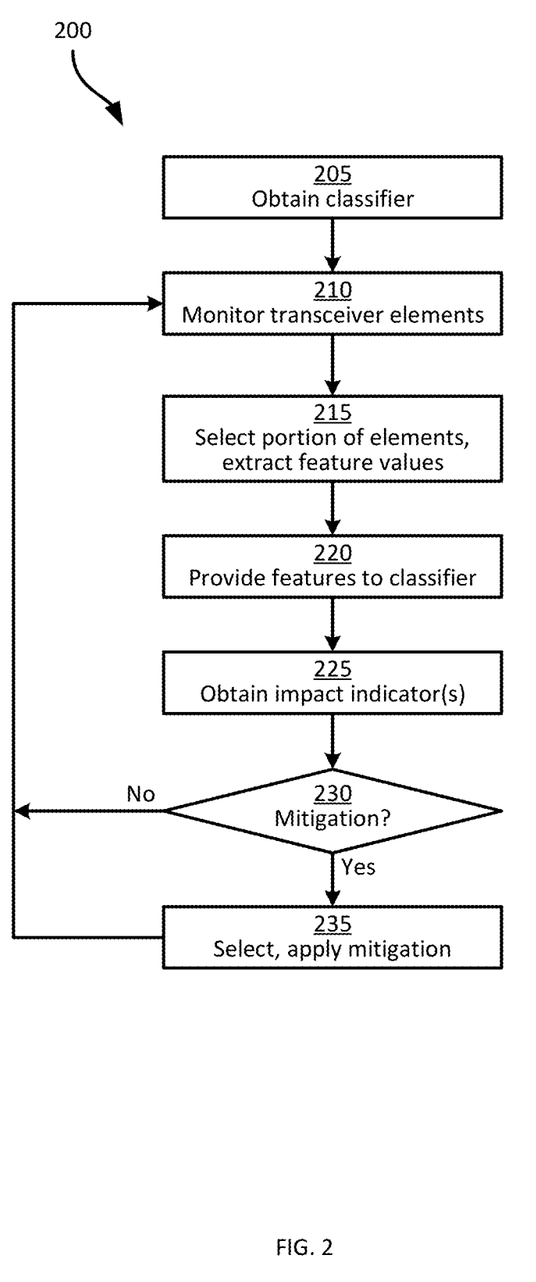
FIG. 2 is a flowchart of a method of application-independent wireless performance impact detection.

Turning to FIG. 2, a method 200 of application-independent detection of wireless performance impacts is illustrated. The method 200 is described below in conjunction with its performance by the device 112, but it will be understood that the method 200 can also be performed by a wide variety of other computing devices. The method 200 can be performed by the device 112 via the execution of the application 144 by the processor 120 and/or a controller of the communications interface 132, in embodiments in which the communications interface 132 includes a separate controller.

At block 205, the device 112 is configured to obtain a classifier, such as the neural network-based classification model mentioned above. Training and generation of the classifier is discussed separately herein. The classifier can be obtained by the device 112 as a component of the application 144. In some examples, the classifier can be a deployable version of a trained neural network, e.g., a binary file generated via TensorFlow or any other suitable library. The classifier obtained at block 205 defines which feature values to provide as inputs to the classifier, and can also define formatting or other data structure requirements for the inputs (e.g., a sample size, as discussed below).

At block 210, the device 112 is configured to monitor, via the communications interface 132, wireless transceiver data elements including any one of, or any combination of, data received at the communications interface 132, data sent from the communications interface 132, and data generated internally at the communications interface 132. Data received at the communications interface 132 can include beacons and other control frames, packets, or the like, received from the APs 104 or other base stations and/or client devices. Data received at the communications interface 132 can also include application-level data, e.g., containing media (e.g., audio, video or the like) for processing by the application 128. Data sent by the communications interface 132 can also include either or both of control frames and/or packets, and application-level data generated by the application 128. Data generated by the communications interface 132 can include events such as roaming decisions, dropped packet detections, and the like.

A wireless transceiver data element can include a received frame, packet, or the like, a transmitted packet, frame, or the like, or an internally-generated event at the communications interface 132. Monitoring wireless transceiver data elements can include, in addition to other typical handling operations for such data elements (e.g., passing packets containing application-level data to the relevant application) storing the elements in a queue or other suitable data structure for further processing via the method 200.

At block 215, the device 112 is configured to select a portion of the monitored elements, and extract feature values from the selected portion. The application 144 can include configuration settings indicating, for example, frame types, subtypes, or the like, or other suitable criteria for selection at block 215. For example, in the context of 802.11-based networks, the selection criteria in the configuration settings can specify that at block 215, frames of the subtypes "management" and "control" are to be included in the selected portion, while frames of the subtype "data" are to be omitted from the selected portion. When the application 128 is running concurrently with the application 144, therefore, at least some of the frames sent and received by the device 112 containing voice data or other media may be omitted from the selected portion at block 215.

The configuration settings noted above can also specify the feature values to extract from the transceiver data elements of the selected portion. The extracted feature values can include any suitable combination of attributes that characterize the wireless connection between the device 112 and the network (e.g., one of the APs 104). For example, the extracted feature values can include a signal strength indicator associated with a received frame, such as a Receive Signal Strength Indicator (RSSI). The extracted feature values can also include a signal-to-noise (SNR) ratio, a frame subtype, and/or a channel (e.g., a frequency band) used for receipt or transmission of the frame. Various other examples of feature values will also be apparent from the above, including for example a data rate such as a modulation and coding scheme (MCS) identifier, and the like. The feature values specified in the configuration settings can be features expected to be present in all elements of the selected portion of transceiver data elements. In some examples, however, the feature values specified in the configuration settings can include features expected to be present in only some of the selected portion of transceiver data elements. For example, features associated with internal events at the communications interface 132 can be employed, such as a number of channels scanned during a scan operation, an indication of success or failure for a roam operation, a number of missing received frames or packets detected, and the like.

Once the specified features are extracted from the selected portion of the wireless transceiver data elements, at block 220 the device 112 is configured to provide the extracted features to the classifier. Providing the extracted features to the classifier can include generating one or more classification samples from the extracted features, e.g., according to a sample structure defined by the classifier, and/or according to a sample size defined by the classifier and specified in the configuration data mentioned above.

Figure 3:
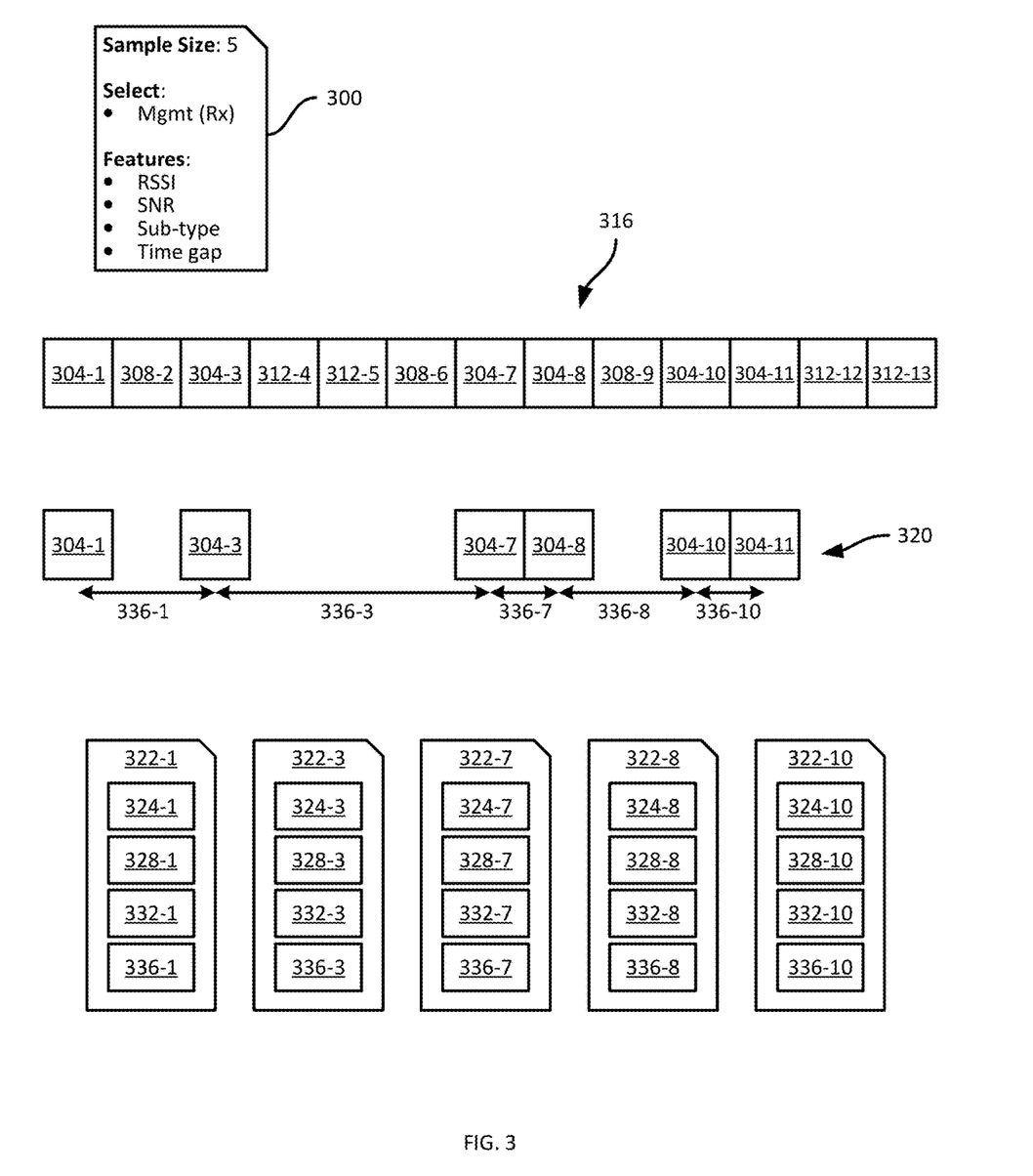
FIG. 3 is a diagram illustrating an example performance of blocks 210 and 215 of the method of FIG. 2.

Turning to FIG. 3, example performances of blocks 210 and 215 of the method 200 are shown. FIG. 3 illustrates example configuration data 300, e.g., included in the application 144 and deployed to the device 112 with the classifier at block 205. The configuration data 300 defines settings according to which the device 112 performs blocks 210, 215, and 220. In particular, the configuration data 300 includes a selection setting that defines what portion of the monitored wireless transceiver data elements are to be selected at block 215.

At block 210, the device 112 can collect (e.g., in a queue or other suitable data structure) wireless transceiver data elements 316. The elements 316 are shown in chronological order from left to right, with the suffix numbers indicating the chronological position of each element (e.g., the suffix numbers are simplified timestamps). The elements 316 can include various types of elements, such as management frames 304 (e.g., beacons, association requests and responses, probe requests and responses, and the like), internal events 308 (e.g., roaming decisions and the like), and data frames 312 containing application-level data such as voice or other media for use by the application 128. The configuration data 300, in this example, indicates that at block 215 the device 112 is to select received management frames for further processing. Therefore, at block 215 the device 112 is configured to select a portion 320 of the elements, including the elements 304-1, 304-3, 304-7, 304-8, 304-10, and 304-11 for further processing. The elements 308 and 312 can be discarded from the queue, although it will be understood that the elements 308 and 312, as well as the elements 304, may still be processed via other functions implemented by the device 112. For example, although the data frames 312 are omitted from further processing in the method 200, the data frames 312 can still be passed to the application 128 for output via the speaker 140 or other handling.

The selected portion 320 of the monitored elements 316 is then processed to extract feature values 322 therefrom, according to the configuration data 300. The example configuration data 300 shown in FIG. 3 lists four feature values to extract for each selected element in the portion 320: a signal strength indicator 324 such as an RSSI value, a SNR value 328, a frame sub-type 332, and a time gap value 336. The time gap value indicates the time separating an element from the next chronological element in the portion 320. For example, the time gap value 336-1 for the element 304-1 is the difference between the timestamps of the elements 304-1 and 304-3. The remaining time gaps 336-3, 336-7, 336-8, and 336-10 are also illustrated in FIG. 3.

Extracted feature values 322 are shown as an example result of block 215. Specifically, each element in the selected portion 320 yields a set 322 of feature values, with the feature value set 322-1 (containing the feature values 324-1, 328-2, 332-1, and 336-1) corresponding to the element 304-1, and the feature value sets 322-3, 322-7, 322-8, and 322-10 corresponding respectively to the elements 304-3, 304-7, 304-8, and 304-10. As will be apparent, the device 112 generates five feature sets 322, according to the sample size setting in the configuration data 300.

Figure 4:
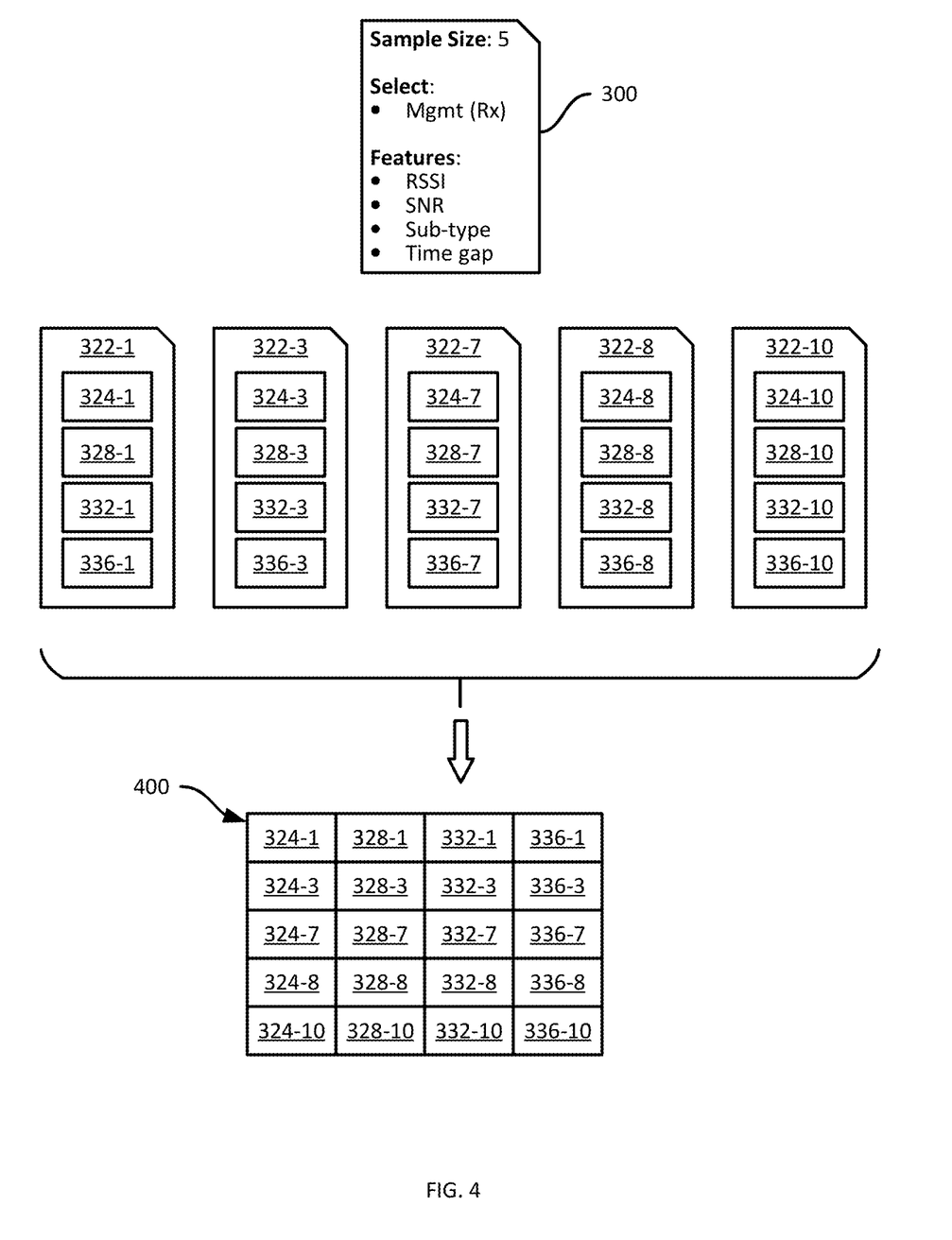
FIG. 4 is a diagram illustrating an example performance of block 220 of the method of FIG. 2.

Turning to FIG. 4, an example performance of block 220 of the method 200 is illustrated, based on the feature sets 322 shown in FIG. 3. As noted above in connection with FIG. 3, and as also shown in FIG. 4, the configuration data 300 indicates a sample size of five. The device 112 is therefore configured to generate a sample for provision to the classifier at block 220 from five elements of the selected portion 320. In the illustrated example, the device 112 can be configured to generate a sample 400 in the form of a two-dimensional array 400, with the set of feature values from each element 304 defining a row, and the rows arranged in chronological order.

Referring again to FIG. 2, at block 225, the device 112 is configured to obtain a performance impact indicator from the classifier, in response to providing the feature values (e.g., the array 400) to the classifier. The performance impact indicator corresponds to a predicted impact of the sets of feature values provided to the classifier on the wireless communications performance of the device 112. As discussed further below, generation of the classifier can include training a neural network model to predict performance impacts based on feature value sets representing the wireless environment of a device. Training data used to generated the classifier can include, for example, a plurality of samples constructed as shown in connection with FIGS. 3 and 4, each labelled with an actual, observed performance impact. The training process configures the classifier to assign, based on a new sample, a likelihood (e.g., expressed as a percentage, a score, or the like), to each of the labels present in the training data set. The classifier can output the most likely label, or a predetermined number of labels (e.g., the most likely three labels). Further, the classifier can output distinct labels for one or more categories of wireless communications performance (e.g., voice, video, file transfer, and the like).

Figure 5:
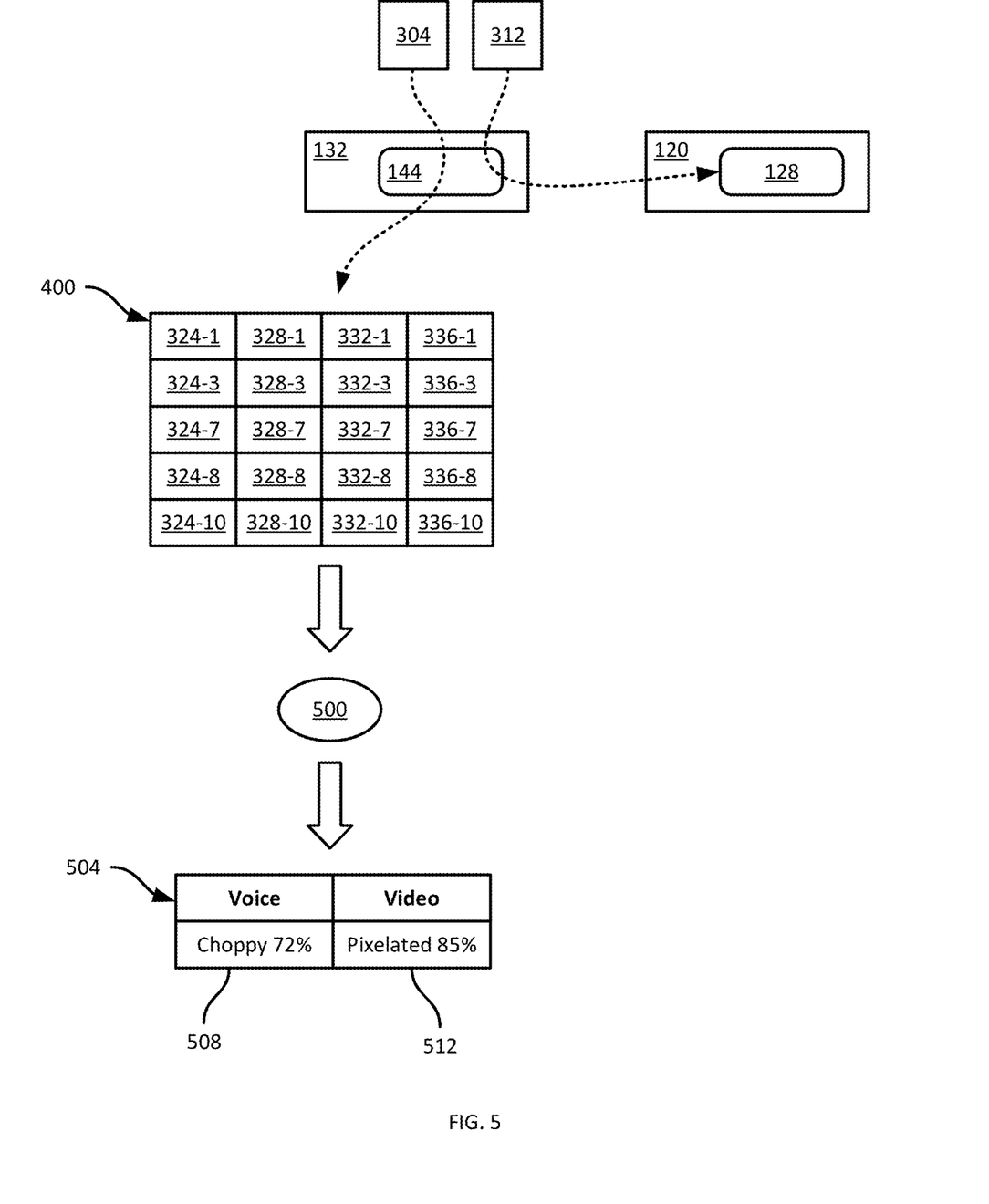
FIG. 5 is a diagram illustrating an example performance of block 225 of the method of FIG. 2.

Turning to FIG. 5, an example performance of block 225 is illustrated. For example, the array 400 can be provided to a classifier 500, e.g., integrated with the application 144 or otherwise accessible to the processor 120 during execution of the application 144. As shown in FIG. 5, the handling of application data such as the data frames 312, and of non-application data such as the control and/or management frames 304, can be divided between the applications 144 and 128. For example, incoming frames (which include non-application data, and may or may not include application data) are received at the communications interface 132 via one or more antenna assemblies or the like. The interface 132 can execute the application 144, e.g., as firmware implementing the suite of Internet protocols. The non-application data, e.g., associated with the transport layer, Internet layer, and link layer protocols, can be processed via the application 144 for connection maintenance, roaming, and the like, as well as for impact detection via the generation and processing of the array 400. The application data, e.g., associated with application layer protocols, can be processed via the application 144 and passed to the application 128 for further processing (e.g., output via the speaker 140). The generation of the array 400, in other words, can be performed by the application 144 whether or not the application 128 is currently executed by the processor 120.

The classifier 500 is configured to generate output 504 including one or more predicted impact indicators from the array 400 (or other suitable sample structure). In the illustrated example, the output 504 of the classifier 500 includes two predicted impact indicators 508 and 512, corresponding to respective categories of wireless communications functionality. For example, the predicted impact indicator 508 indicates that the most likely performance impact of the current wireless environment of the device 112 on voice communication is choppy audio output at the speaker 140 (e.g., with a likelihood of 72%). The predicted impact indicator 512 indicates that the most likely performance impact of the current wireless environment of the device 112 on video communication is pixelated video (e.g., with a likelihood of 85%).

The predicted impact indicator(s) obtained at block 225 can include indicators for more than the two categories shown in FIG. 5, or for a single category. In some examples, the application 144 can be configured to determine, e.g., from a listing of which applications are present in the memory 124, which of the available categories of predetermined impact indicators are represented in the listing. The application 144 can then discard any impact indicators produced by the classifier 500 for which no corresponding application is present in the listing, and output any remaining impact indicators.

Returning to FIG. 2, at block 230 the device 112 is configured to determine whether to take any mitigating actions in response to the predicted impact indicator(s) obtained at block 225. The determination at block 230 can include determining whether a severity of the performance impact indicator meets a predetermined threshold. For example, each performance impact indicator can be categorized as requiring mitigation or not. For instance, in the case of voice communications, a "normal" impact indicator (e.g., indicating that no perceptible degradation of communications performance is likely) and a "choppy" impact indicator (e.g., indicating that interruptions shorter than about 300 ms in audio are likely) may be categorized as not requiring mitigation. Other impact indicators, such as a "long gaps" indicator (e.g., indicating that interruptions longer than about 1 s in audio are likely), may be categorized as requiring mitigation. Various other assessments can also be performed at block 230, including an assessment of whether a sufficient number of consecutive performance indicators (e.g., via a number of successive performances of block 225) meet the severity threshold.

When the determination at block 230 is negative, the device 112 can return to block 210 to continue monitoring and obtaining further performance impact indicators. When the determination at block 230 is affirmative, the device 112 can be configured to select and execute a mitigation action based on the performance impact indicator(s) from block 225. Block 235 can include, for example, selecting an audio and/or video codec for use within the application 128, if the application 128 is currently running. The application 128 can maintain a list of impact indicators, and corresponding audio and/or video codecs to use, for example. Various other application-specific settings can also be mapped to predicted impact indicators.

In other examples, there may not be a currently executing wireless communications application. The determination at block 230 and the mitigation action at 235 can be performed by such an application when the application is launched. For example, the performance impact indicator(s) can be published, e.g., by an operating system of the device 112. Applications such as the application 128 can subscribe to the performance impact indicators, and retrieve any available performance impact indicators upon launch (the published impact indicators may persist for a predetermined period of time before being unpublished, e.g., deleted).

In further examples, the determination at block 230 and mitigation action at block 235 can be performed by a controller of the communications interface 132, in addition to or instead of the processor 120 via execution of the application 128. The communications interface 132 can, for example, decrease a data rate for wireless communications, e.g., by selecting a lower MCS identifier for wireless communications, when the performance impact indicator is above a severity threshold.

In further examples, the mitigating action can include sending a notification to a network infrastructure component, such as the controller 108, when the performance impact indicator meets the severity threshold. The controller 108 or other suitable network infrastructure can then be configured to determine whether to alter the operation of one or more APs 104. In still further examples, the mitigation action can include presenting the impact indicator(s) obtained at block 225 on the display 136 or via another suitable output device.

Following one or more mitigation actions at block 235, the device 112 can return to block 210, to continue monitoring and generating further performance impact indicators. For example, the device 112 can be configured to perform the method 200 substantially continuously, or at a configurable frequency, e.g., to produce a performance impact indicator every second, every ten seconds, or any other suitable period.

Figure 6:
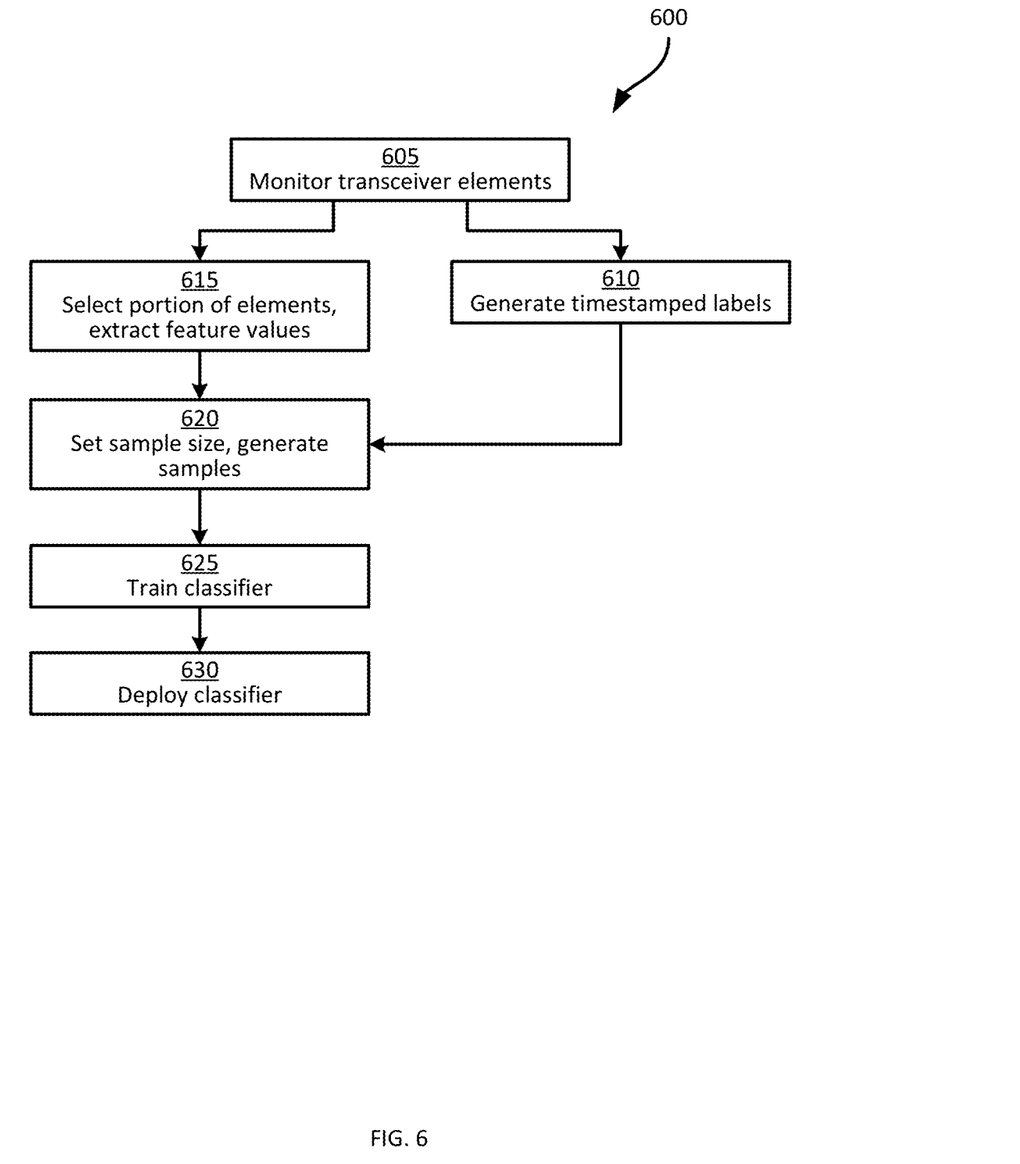
FIG. 6 is a flowchart of a method of generating a classifier for use in the method of FIG. 2.

Turning to FIG. 6, a method 600 for generating the classifier 600 prior to deployment is illustrated. The method 600 can be performed, e.g., at the device 112a or another suitable computing device, prior to deployment of the classifier 500 to the device 112 at block 205 of the method 200. In some examples, as noted below, certain blocks of the method 600 are performed at multiple computing devices, e.g., to collect training data, and other blocks of the method 600 are performed at a single computing device, e.g., to train a neural network model or other suitable model with the training data.

At block 605, the device 112a and, in some examples, one or more additional computing devices functionally equivalent to the device 112a, are configured to monitor wireless transceiver data elements. As described above in connection with block 210, monitoring wireless transceiver data elements can include collecting the elements (e.g., frames and/or packets, as well as internal events of the communications interface 132a) in a queue or other data structure for storage and processing. The monitoring at block 605 can be performed via execution of the application 144a, and is also performed concurrently with execution of the application 128a. While runtime use of the classifier 500 need not coincide with execution of the application 128, concurrent execution of the application 128a with the application 144a facilitates the automated generation of labels for training data, as discussed further below.

At block 610, the device 112a, e.g., via execution of the application 128a, can be configured to generate timestamped labels for the monitored transceiver elements. As will be apparent, some of the monitored elements include application data such as packets of voice data (e.g., as in the case of the elements 312 shown in FIG. 3) forming a real-time transport protocol (RTP) stream. Those elements are passed to the application 128*a*, which can be modified relative to the application 128 to include labelling criteria. The application 128*a* can therefore label sets of voice packets (or any other suitable element of application-level data, depending on the nature of the application 128*a*) according to the labelling criteria.

A wide variety of labelling criteria are contemplated. For example, the application 128*a* can include distinct criteria for each of a predetermined set of labels. In the case of voice communications, for example, five example labels (corresponding to five performance impact indicators) include the following:

A "choppy" label can be generated for a time period containing a gap in received audio of between about 150 and about 300 ms (a wide variety of other gap lengths can also be employed, both for this label and other labels set out below). For example, the time period associated with the label can be selected to contain the gap, with about 100 ms before and after the gap. A "short gap" label can be generated for a time period containing a gap in received audio of between about 300 ms and about 2 seconds. A "long gap" label can be generated for a time period containing a gap in received audio greater than about 2 seconds. A "glitching" or "garbled" label can be generated for a time period containing a burst of received audio data, such as a burst of 20 packets within a period of 25 ms (indicating a possible buffer overrun, which can lead to audio quality degradation). A "good" or "normal" label can be generated for a time period that does not contain application data satisfying any of the criteria above. The labels generated at block 610 can be stored for subsequent use in generating training data samples.

At block 615, e.g., concurrently with the performance of block 610 (although blocks 610 and 615 can also be performed sequentially in other examples, with either block 610 or block 615 being performed first), the device 112*a* is configured to select a portion of the elements collected at block 605. As discussed earlier in connection with block 215, the selection at block 615 includes retaining elements of predetermined types, and omitting the remaining elements. The elements selected at block 615 omit application-level data, to permit the resulting classifier to operate even when no wireless communications application is running. The portion selected at block 615 can therefore include control frames, management frames, and certain internal events of the communications interface 132*a*, and omit frames containing application-level data (which are passed to the application 128*a* for automated labelling at block 610).

Figure 7:
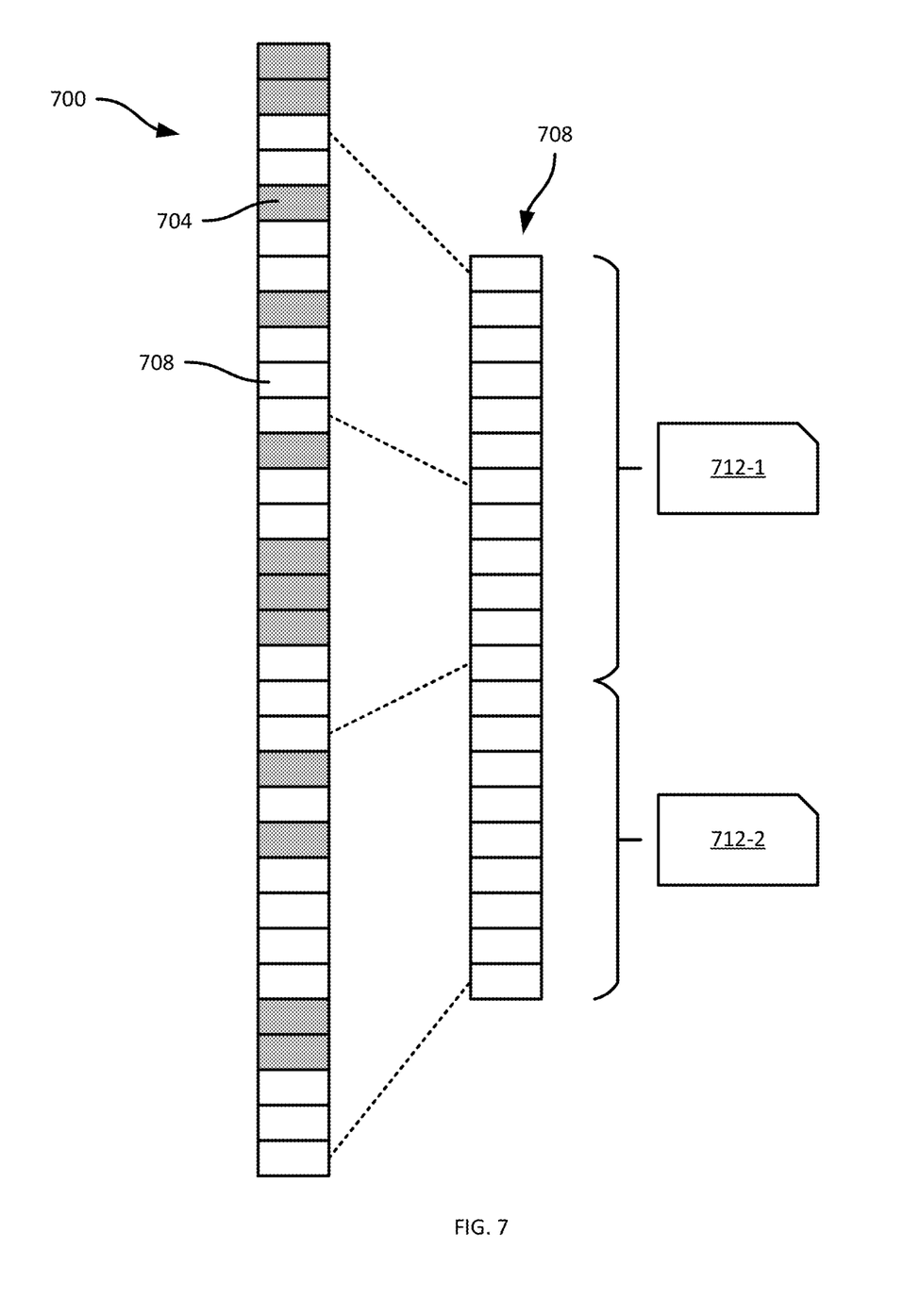
FIG. 7 is a diagram illustrating an example performance of blocks 605 and 610 of the method of FIG. 6.

FIG. 7 illustrates an example performance of blocks 605 and 610. A plurality of transceiver data elements 700 includes management frames 704, and application data frames 708, e.g., for processing by the application 128*a*. The application data frames 708 are passed to the application 128*a*, e.g., omitting the management frames 704. The application 128*a* can be configured to determine whether any portions of the audio stream represented by the application data frames 708 satisfies one or more labelling criteria. Distinct sets of labelling criteria can be implemented, corresponding to distinct labels. For example, the application 128*a* can include criteria corresponding to the labels "choppy", "short gap", and the like as set out above, including the thresholds noted above. In the illustrated example, the application 128*a* can be configured to generate a first label 712-1 based on a first group of consecutive application data frames 708, and a second label 712-2 based on a second group of consecutive application data frames 708. Each label includes a label identifier (e.g., "choppy", "good", or the like), as well as a time period, e.g., indicated by starting and ending timestamps derived from the corresponding group of frames 708.

In some embodiments, blocks 605 and 610 are performed by the device 112*a*, and optionally by a plurality of other devices collecting data while engaged in wireless communications. The remaining blocks of the method 600 can be performed by a computing device configured to receive the raw data collected by the device 112*a* and any other collection devices in the system 100. In the discussion below, for simplicity, the device 112*a* is described as performing the method 600 locally.

At block 620, the device 112*a* is configured to set a sample size, and generate samples of training data for use in generating the classifier. Sample size refers to the number of elements from block 615 that are used to generate one sample of training data. As will now be understood, the sample size set at block 620 can be included in the configuration data 300, and is subsequently used by the device 112 and any other device to which the classifier 500 is deployed in generating samples for classification at block 220 of the method 200.

Figure 8:
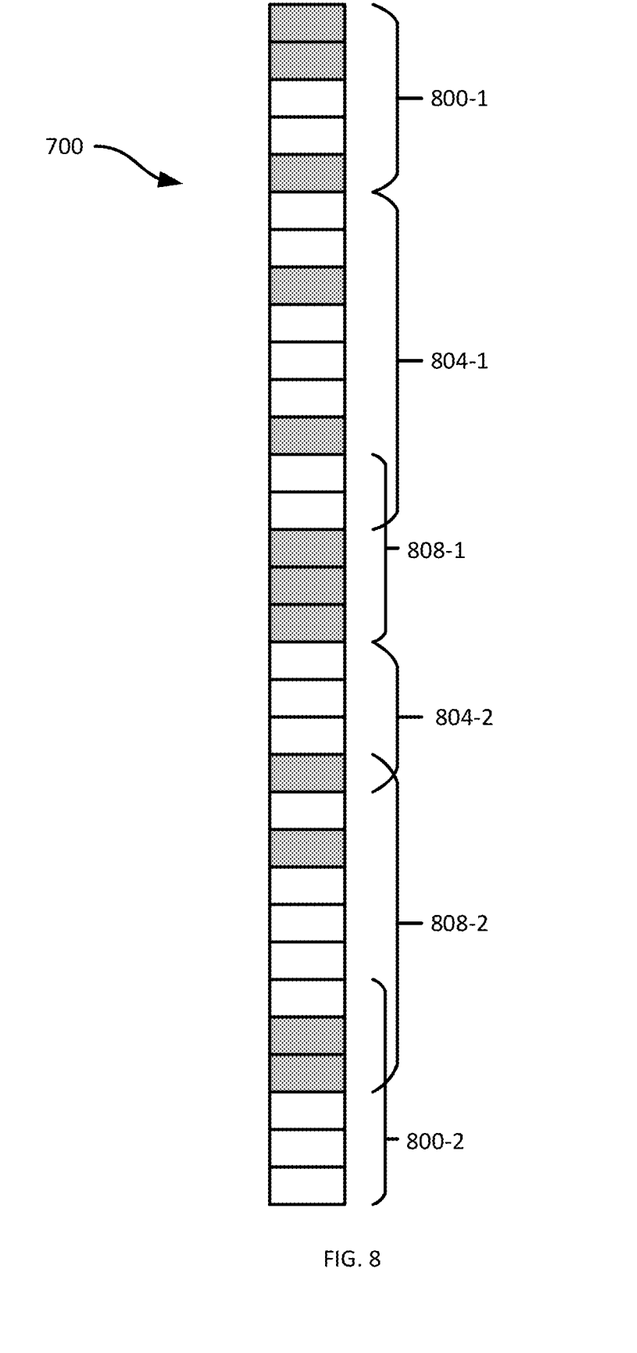
FIG. 8 is a diagram illustrating pattern detection in an example performance of block 620 of the method of FIG. 6.

Setting the sample size at block 620 can include retrieving a predetermined sample size, e.g., from the memory 124*a*. In other examples, the sample size can be determined from the data collected at block 605. For example, the device 112*a* can be configured to detect one or more predetermined patterns in the wireless transceiver data elements collected at block 605, and to select the sample size based on the detected patterns. Predetermined patterns do not necessarily correspond to conditions observed in the application 128*a*. That is, the patterns do not necessarily correspond directly to the labels 712 mentioned above. The patterns can correspond to scan and roam operations, packet retries, and the like. Criteria used to detect patterns can therefore include, for example, a threshold number of packet retransmissions (e.g., following a lack of acknowledgement of those packets) within a threshold time period. FIG. 8 illustrates an example detection of patterns from the elements 700 collected at block 605. For example, the device 112*a* detects respective patterns 800-1, 804-1, 808-1, 804-2, 808-2, and 800-2, in the elements 700. The detected patterns include patterns of three types (800, 804, and 808). To determine a sample size, the device 112*a* can be configured to determine the smallest number of elements 700 defining a pattern. In the example of FIG. 8, the pattern 804-2 is defined by four consecutive elements, which is fewer than any of the other illustrated patterns. A sample size of four is therefore selected in this example.

Figure 9:
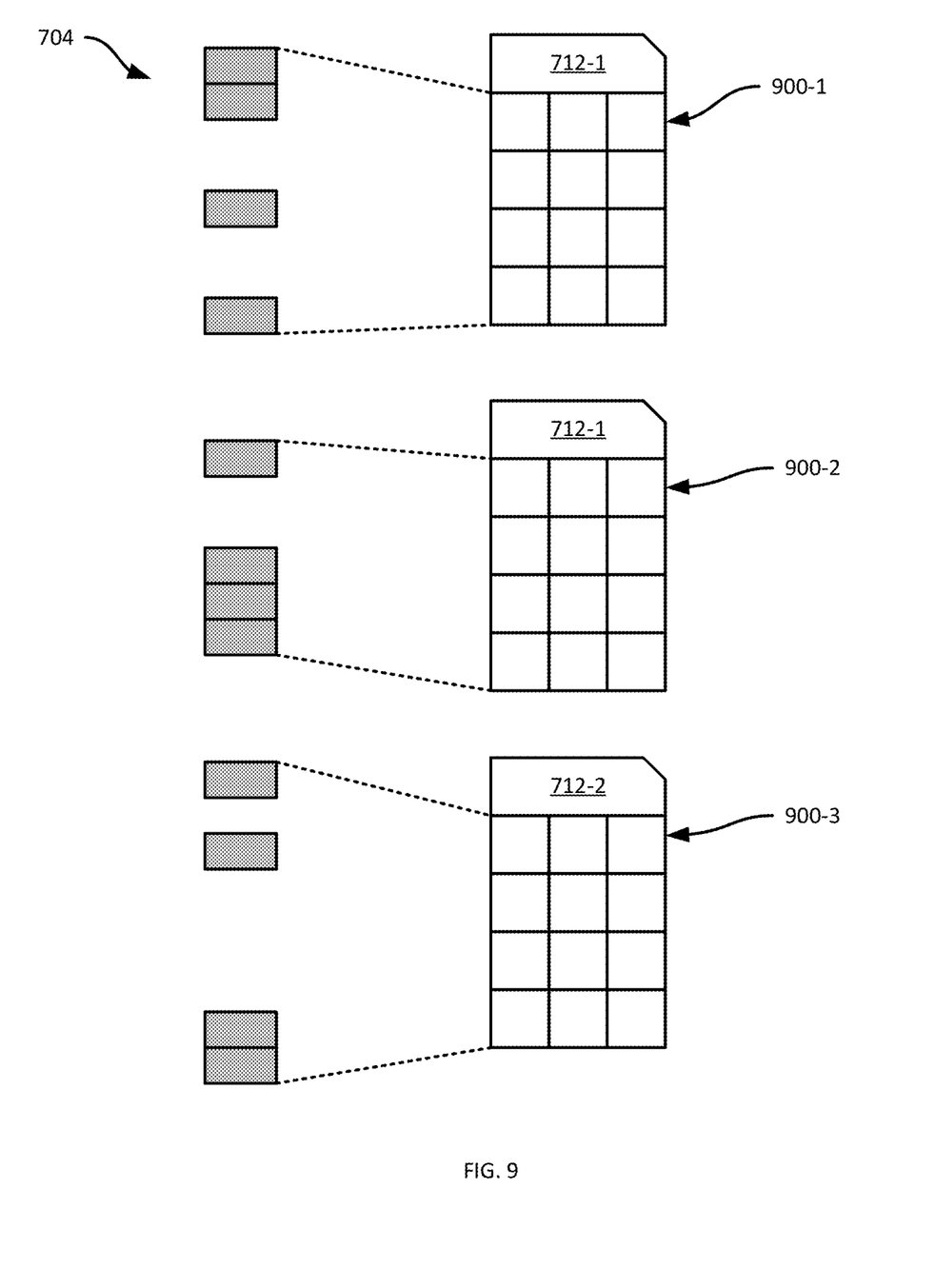
FIG. 9 is a diagram illustrating sample generation in an example performance of block 620 of the method of FIG. 6.

To complete the performance of block 620, as shown in FIG. 9, the device 112*a* is configured to assemble the sets of feature values for the elements in the portion selected at block 615, according to the sample size set out above. As shown in FIG. 9, the management frames 704 (selected at block 615, with the application data frames omitted) are assembled into samples in sets of four, e.g., with each sample 900-1, 900-2, 900-3 including four rows corresponding to respective elements 704, and each row containing three feature values. Each sample 900 is also labelled according to the labels 712 noted above. The time period associated with the label 712-1 encompasses the elements 704 of the first and second samples 900-1 and 900-2, while the time period associated with the label 712-2 encompasses the elements 704 of the third sample 900-3.

Referring again to FIG. 6, at block 625, the device 112*a* is configured to train the classifier, using the labelled samples 900 discussed above. At block 630, the resulting classifier 500 is deployed to the device 112 for use according to the method 200, e.g., along with the configuration data 300 defining the sample size, feature values, and the like.

As will be apparent, the example feature values and other parameters discussed above are provided for example only, and numerous other feature values can also be employed in the methods 200 and 600. Other example feature values including a number of missing frames or packets (e.g., detected based on sequence numbers in the frames or packets), a number of packet retries, a number of packet errors, and the like.

The hardware elements discussed above, and the methods performed thereby, can therefore provide technical improvements to the performance of the device 112 under certain conditions. For example, the above functionality can enable the device 112 to automatically detect multivariate performance impacts that originate with the wireless connection between the device 112 and an AP 104. Such detection is further based on non-application data, e.g., data associated with one or more of the transport layer, the Internet layer, and the link layer of the IP suite. Impact detection can therefore be performed whether or not the potentially affected application(s) are currently being executed. The impact detection set out above can therefore also enable the device 112 to predict performance impacts on an application before the application starts. The automated detection of such impacts further enables the device 112 to take mitigating actions to improve the performance of functions such as voice calls, video calls, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:
monitoring, via a communications interface of the computing device, wireless data elements including application data corresponding to a communications application, and non-application data;
automatically generating labels based on the application data of the wireless data elements, the labels indicating performance impacts observable in the communications application;
selecting a portion of the wireless data elements corresponding to the non-application data;
extracting, from each wireless data element of the non-application data, a set of feature values;
generating a plurality of samples from the non-application data, each sample including (i) a number of the sets of feature values based on a sample size, and (ii) one of the automatically generated labels;
training a classifier based on the plurality of samples, the classifier configured to receive further non-application data and generate a predicted impact indicator selected from the labels; and
deploying the classifier.

2. The method of claim 1, wherein deploying the classifier comprises providing the classifier to a wireless communications device.

3. The method of claim 1, wherein deploying the classifier comprises, at the computing device:
monitoring, via the communications interface, further wireless data elements;
selecting a further portion of the wireless data elements excluding application data;
extracting, from each wireless data element of the further portion, a further set of feature values;
providing the further sets of feature values to the classifier;
receiving, from the classifier, one of the performance impact indicators defining a predicted impact of the further sets of feature values observable in the communications application; and
selecting an action based on the one of the performance impact indicators, to mitigate the predicted impact.

4. The method of claim 1, wherein automatically generating the labels comprises:
maintaining a plurality of label identifiers in association with respective labelling criteria;
determining that a portion of the application data corresponding to a time period meets a labelling criterion; and
generating a label having the label identifier and an indication of the time period.

5. The method of claim 1, wherein the application data includes application data corresponding to a plurality of categories of communications application; and
wherein automatically generating the labels includes automatically generating labels for each of the categories of communications application.

6. The method of claim 5, wherein the categories of communications application include at least one of:
voice call applications,
video call applications, and
file transfer applications.

7. The method of claim 1, wherein the set of feature values extracted from each wireless data element includes at least one of:
a signal strength indicator,
a signal-to-noise indicator,
an element subtype, and
a time elapsed between the wireless data element and an adjacent wireless data element in the non-application data.

8. The method of claim 1, further comprising, prior to generating the plurality of samples, determining the sample size.

9. The method of claim 8, wherein determining the sample size comprises:
detecting a plurality of predetermined patterns in the wireless data elements, each pattern defined by a subset of consecutive wireless data elements; and
determining the smallest subset of consecutive wireless data elements as the sample size.

10. A computing device, comprising:
a communications interface; and
a processor configured to:
monitor, via the communications interface, wireless data elements including application data corresponding to a communications application, and non-application data;
automatically generate labels based on the application data of the wireless data elements, the labels indicating performance impacts observable in the communications application;
select a portion of the wireless data elements corresponding to the non-application data;
extract, from each wireless data element of the non-application data, a set of feature values;
generate a plurality of samples from the non-application data, each sample including (i) a number of the sets of feature values based on a sample size, and (ii) one of the automatically generated labels;
train a classifier based on the plurality of samples, the classifier configured to receive further non-application data and generate a predicted impact indicator selected from the labels; and
deploy the classifier.

11. The computing device of claim 10, wherein the processor is configured to deploy the classifier by providing the classifier to a wireless communications device.

12. The computing device of claim 10, wherein the processor is configured to deploy the classifier by:
monitoring, via the communications interface, further wireless data elements;
selecting a further portion of the wireless data elements excluding application data;
extracting, from each wireless data element of the further portion, a further set of feature values;
providing the further sets of feature values to the classifier;
receiving, from the classifier, one of the performance impact indicators defining a predicted impact of the further sets of feature values observable in the communications application; and
selecting an action based on the one of the performance impact indicators, to mitigate the predicted impact.

13. The computing device of claim 10, wherein the processor is configured to automatically generate the labels by:
maintaining a plurality of label identifiers in association with respective labelling criteria;

determining that a portion of the application data corresponding to a time period meets a labelling criterion; and generating a label having the label identifier and an indication of the time period.

14. The computing device of claim 10, wherein the application data includes application data corresponding to a plurality of categories of communications application; and wherein the processor is configured to automatically generate the labels by automatically generating labels for each of the categories of communications application.

15. The computing device of claim 14, wherein the categories of communications application include at least one of:

voice call applications,
video call applications, and
file transfer applications.

16. The computing device of claim 10, wherein the set of feature values extracted from each wireless data element includes at least one of:

a signal strength indicator,
a signal-to-noise indicator,
an element subtype, and
a time elapsed between the wireless data element and an adjacent wireless data element in the non-application data.

17. The computing device of claim 10, wherein the processor is configured, prior to generating the plurality of samples, to determine the sample size.

18. The computing device of claim 17, wherein the processor is configured to determine the sample size by:

detecting a plurality of predetermined patterns in the wireless data elements, each pattern defined by a subset of consecutive wireless data elements; and determining the smallest subset of consecutive wireless data elements as the sample size.

19. A method in a computing device, the method comprising:

maintaining, at the computing device, a wireless communications application executable to process application data received via a communications interface of the computing device;

monitoring, via the communications interface, wireless data elements;

selecting a portion of the wireless data elements, the portion excluding wireless data elements containing application data;

extracting, from each wireless data element of the selected portion, a set of feature values;

providing the sets of feature values to a classifier;

receiving, from the classifier, one or more of a predetermined set of performance impact indicators, the obtained performance impact indicator defining a predicted impact of the sets of feature values on processing of the application data via the wireless communications application; and selecting an action based on the performance impact indicator, to mitigate the predicted impact on processing of the application data via the wireless communications application.

20. The method of claim 19, wherein the set of feature values extracted from each wireless data element includes at least one of:

a signal strength indicator,
a signal-to-noise indicator,
an element subtype, and
a time elapsed between the wireless data element and an adjacent wireless data element in the portion.

21. The method of claim 19, wherein the obtaining includes obtaining a performance impact indicator for each of a plurality of categories of wireless communications application, the categories of wireless communications application including at least one of:

voice call applications,
video call applications, and
file transfer applications.

* * * * *